April 23, 1946.  E. W. SEEGER  2,399,067
MOTOR CONTROL SYSTEM
Filed Dec. 11, 1943
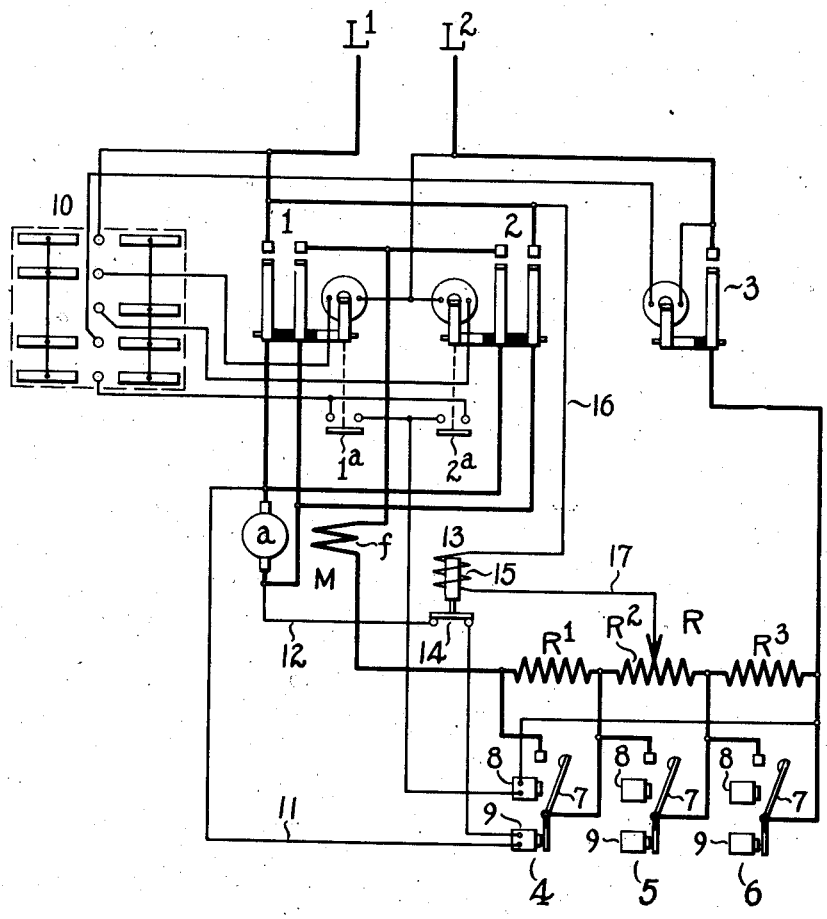
Inventor
Edwin W. Seeger
By Frank W. Hubbard
Attorney Patented Apr. 23, 1946

2,399,067

UNITED STATES PATENT OFFICE 2,399,067

MOTOR CONTROL SYSTEM

Edwin W. Seeger, Wauwatosa, Wis., assignor to Cutler-Hammer, Inc., Milwaukee, Wis., a corporation of Delaware Application December 11, 1943, Serial No. 513,825

4 Claims. (Cl. 172—179)

This invention relates to motor control systems and more particularly to systems affording starting, accelerating and stopping by plugging of the motor.

In such systems it is common to provide a resistor having a portion for limiting the current during plugging, or in other words, reverse current braking and a portion for limiting the current during acceleration, the former portion of the resistor being excluded from circuit upon initial starting of the motor. In plugging, the first mentioned portion of the resistor is initially included in circuit and excluded from circuit as the motor slows down to a certain speed and the preferred control for such portion of the resistor comprises an electroresponsive switch tending to close upon initiation of plugging but having a restraining winding connected across the motor armature to be effective until the motor speed is reduced by plugging to substantially zero value. On the other hand, where such a control switch is used for the plugging portion of the resistor it is highly desirable if not imperative to provide means insuring against exciting the restraining winding, as by inching of the motor, to restrain the plugging switch against the desired operation and subsequently accelerating the motor, and this has heretofore been accomplished through use of a rectifier in conjunction with the plugging switch.

An object of the present invention is to simplify and reduce the cost of control systems of the character aforedescribed and to render unnecessary resort to rectifiers.

A further object is to accomplish the ultimate function of the rectifier in the relation aforestated by employment of a simple and inexpensive electroresponsive relay.

Various other objects and advantages of the invention will hereinafter appear.

The accompanying drawing illustrates diagrammatically an embodiment of the invention which will now be described, it being understood that the embodiment illustrated is susceptible of various modifications without departing from the scope of the appended claims.

Referring to the drawing, it shows a motor M having an armature $a$ and a series field winding $f$, said motor being supplied from lines $L^1$, $L^2$, the motor connections being such as to provide for reversal of the direction of flow of current through the motor armature without change of direction of current flow through the field winding. The motor connections include a resistor R comprising sections $R^1$, $R^2$ and $R^3$. The resistor sections $R^2$ and $R^3$ constitute the portion of resistor employed for acceleration while the resistor section $R^1$ constitutes the resistor portion employed for plugging.

The direction of current flow through the motor armature is controlled by electroresponsive reversing switches 1 and 2 which together with an electroresponsive main switch 3 control the continuity of the motor circuit. The reversing switches 1 and 2 are shown as of a conventional double pole type, while the main switch 3 is shown as of a conventional single pole type and the reversing switches are shown as having the usual connections by which they reverse the flow of current through the motor armature.

The resistor sections $R^1$, $R^2$ and $R^3$ are in series with one another and with the motor armature and field winding, being respectively subject to short-circuiting by electroresponsive switches 4, 5 and 6. These switches are shown as of a conventional form, each comprising a lever 7 pivoted intermediate of its extremities and having an operating winding 8 and a restraining winding 9, said windings exerting pulls on said lever above and below its pivot. As will be understood, this type of switch enables energization of its operating winding without effecting operation of the lever if the restraining winding is at that time energized to a predetermined degree. In other words, if the restraining winding is sufficiently energized when the operating winding is energized the former will restrain operation of the switch until the restraining winding is deenergized to a predetermined extent. As will be understood, this type of switch may be utilized to afford current limit control or time limit control of various kinds including inductive time limit and condenser time limit control. In practice the accelerating switches are preferably so utilized as to provide either current or time limit control as may be desired, and such control being well known as already indicated, no control connections have been shown for the accelerating switches 5 and 6.

The reversing switches 1 and 2, the main switch 3 and the operating winding of plugging switch 4 are shown as being under the control of a conventional type of master switch 10 which is shown in its off position deenergizing switches 1 to 3 and the operating winding of switch 4. As will be understood, the master switch 10 is movable in opposite directions selectively to effect selectively forward or reverse operation of motor M. The master switch in its first operative position when moved in either direction energizes one of the reversing switches, the main switch and the operating winding 8 of plugging switch 4. However, energization of the operating winding of switch 4 is dependent upon prior energization of one of the reversing switches to engage either the contacts $1^a$ or the contacts $2^a$ which constitute auxiliary contacts for the switches 1 and 2, respectively. Also as will be understood, the master switch would ordinarily be provided with additional contacts and segments to control the operating windings of the accelerating switches 5 and 6.

Referring now to the connections for the restraining winding 9 of the plugging switch 4, they comprise a connection 11 between one terminal of said winding and the left hand terminal of the motor armature and a connection 12 between the other terminal of said winding and the right hand terminal of the motor armature, the connection 12 including the contacts 14 of a normally closed relay 13. The relay 13 is normally closed in the sense that its contacts engage when said relay is deenergized, the winding 15 of said relay having a connection 16 to line L¹ and a connection 17 to a mid point of the multi section resistor R. Thus with the main switch 3 open as illustrated the winding 9 of the plugging switch 4 is actually connected to the motor armature to be subjected to the influence of the C. E. M. F. On the other hand, when the main switch and either of the reversing switches close, the winding 15 of relay 13 is subjected to a potential drop, causing it to open relay contacts 14, thereby interrupting the circuit of winding 9 of plugging switch 4 to permit said switch to close immediately following completion of the motor circuit for acceleration or for inching.

As aforeindicated, and as is well known, the restraining winding 9 of the plugging switch, assuming its connection across the motor armature by the relay 13, will restrain operation of the switch 4 to insure inclusion of the plugging resistor R¹, pending slowdown of the motor by plugging, to substantially zero speed while definitely freeing switch 4 for response as an incident to reversal of rotation of the motor and its reacceleration. Also as is well understood, plugging of the motor involves movement of the master switch through its off position to open momentarily the motor circuit, to release the switches 4, 5 and 6 for inclusion of all of the resistor R and to release the relay 13 to connect winding 9 to the motor armature for functioning in the manner just stated.

When in the plugging operation the switch 13 is thus released, it remains released, according to its design and adjustment, for a substantial part of the plugging period because of the connection of its operating winding between line L¹ and a mid point of resistor R. As is well understood, when the master switch is moved through off position to its opposite running position the resistor R is subjected to opposed and substantially equal potentials supplied respectively by the line and the motor acting as a generator due to the kinetic energy stored therein. Thus the winding of relay 13 being connected to a mid point of the resistor R is without impressed potential pending substantial reduction in the generating action of the motor, this affording a sufficient period for the restraining action of the winding 9 of the plugging switch 4.

On the other hand, the relay 13 is insured energization following plugging by the stopping and reversing of the motor incident to plugging assuming the plugging connections to be maintained for acceleration of the motor in the reverse direction. Thus undesirable lockout of the plugging switch H is insured against following plugging, where as previously pointed out the same means insures freedom of the plugging switch to respond following inching of the motor.

What I claim as new and desire to secure by Letters Patent is:

1. In combination, a motor, a series resistor therefor, means to complete the circuit of said motor inclusive of said resistor and to effect reversals of said motor, and means controlling said resistor for both acceleration and plugging of said motor, the last mentioned means comprising for control of a portion of said resistor a switch having a restraining winding, and further comprising a relay to make connections between said restraining winding and said motor for action in plugging and to disconnect said restraining winding for inaction in accelerating, said relay having electroresponsive control means subjected to influence by the electrical condition of said motor to cause said relay to function as aforestated automatically.

2. In combination, a motor, a series resistor therefor, means to complete the circuit of said motor inclusive of said resistor and to effect reversals of said motor, and means controlling said resistor for both acceleration and plugging of said motor, the last mentioned means comprising for control of a portion of said resistor a switch having a restraining winding, and further comprising a relay to make connections between said restraining winding and said motor for action in plugging and to disconnect said restraining winding for inaction in accelerating, said relay having electroresponsive control means connected in circuit to have an effective voltage impressed thereon, upon initial starting of said motor and thereafter except when said motor operates as a generator in plugging and to be without an effective impressed voltage upon initiation of action of said motor as a generator in plugging and for an appreciable period in slowdown of said motor by plugging.

3. In combination, a motor, a series resistor therefor, means to complete the circuit of said motor inclusive of said resistor and to effect reversals of said motor, and means controlling said resistor for both acceleration and plugging of said motor, the last mentioned means comprising for control of a portion of said resistor a switch having a restraining winding and further comprising a relay to make connections between said restraining winding and said motor for action in plugging and to disconnect said restraining winding for inaction in accelerating, said relay having a control winding connected between one side of the supply source of said motor and a mid point of said resistor to render it effective for the aforestated actions automatically.

4. In combination, a motor, a series resistor therefor, means to complete the circuit of said motor inclusive of said resistor and to effect reversals of said motor, and means controlling said resistor for both acceleration and plugging of said motor, the last mentioned means comprising for control of a portion of said resistor a switch having a restraining winding and further comprising a relay to make connections between said restraining winding and said motor for action in plugging and to disconnect said restraining winding for inaction in accelerating, said relay being of the normally closed type and having an electroresponsive winding to effect opening thereof, said winding being connected between one side of the supply circuit of said motor and a mid point of said resistor and rendering the aforestated functioning of said relay automatic.

EDWIN W. SEEGER.